United States Patent
Davies et al.

(10) Patent No.: US 6,753,790 B2
(45) Date of Patent: Jun. 22, 2004

(54) METHOD AND AN APPARATUS FOR AN ADAPTIVE REMOTE CONTROLLER

(75) Inventors: Nigel Andrew Justin Davies, Hala (GB); Pierre-Guillaume Raverdy, Santa Clara, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 382 days.

(21) Appl. No.: 09/875,400

(22) Filed: Jun. 5, 2001

(65) Prior Publication Data

US 2002/0070873 A1 Jun. 13, 2002

Related U.S. Application Data

(60) Provisional application No. 60/255,786, filed on Dec. 13, 2000.

(51) Int. Cl.[7] ............................ G08C 19/00; G08B 5/22
(52) U.S. Cl. ............................ 340/825.69; 340/825.49; 340/3.71; 348/734
(58) Field of Search ........................ 340/825.69, 825.72, 340/825.49, 5.72, 825.73, 539.1, 539.13, 539.15, 539.21, 539.3, 3.71, 3.7; 348/734, 585, 725; 398/111.106, 115

(56) References Cited

U.S. PATENT DOCUMENTS 5,500,691 A * 3/1996 Martin et al. .............. 348/734
6,549,117 B1 * 4/2003 Kato et al. ................. 340/5.72
6,563,430 B1 * 5/2003 Kemink et al. ........ 340/825.49

* cited by examiner

*Primary Examiner*—Edwin C. Holloway, III
*Assistant Examiner*—William Bangachon
(74) *Attorney, Agent, or Firm*—Blakely, Sokoloff, Taylor & Zafman LLP

(57) ABSTRACT

A method and an apparatus for an adaptive remote controller are provided. The remote controller comprises a user control input, a detector, and a user interface. The user control input is configured to receive user input and issue at least one control signal to a target device. The detector is configured to detect if the remote controller is within a target device feedback range. If the remote controller is out of the target device feedback range, the user interface provides feedback that the control signal was successfully sent to and executed by the target device.

31 Claims, 4 Drawing Sheets

METHOD AND AN APPARATUS FOR AN ADAPTIVE REMOTE CONTROLLER

CROSS-REFERENCE TO RELATED APPLICATIONS

This application claims the benefit of the filing date of the following Provisional U.S. Patent Application: "A METHOD AND AN APPARATUS FOR AN ADAPTIVE REMOTE CONTROLLER", application number 60/255,786, filed Dec. 13, 2000.

FIELD OF THE INVENTION

The present invention relates generally to remote controllers and, more particularly, to a method and an apparatus for an adaptive remote controller.

BACKGROUND OF THE INVENTION

Currently, there are many remote controllers that allow a user to send control signals from a remote controller device to a target device such as a television. With increasing use of electronic equipment such as audio and video devices, there is a corresponding increase in the use of remote controllers for accessing the electronic equipment.

Conventional remote controllers are designed to be used while the user can see the device being controlled. In particular, all the feedback about the success or failure of operations is typically provided by the target device rather than through the remote controller. For example, a user pushes a power button on a TV remote control and the TV turns on. The reason that the feedback has generally been from the target device itself is because the technology used in these remote controllers has been infrared technology. In order for infrared technology to be functional, the user must be close to the target device. Particularly, there must be a clear line of sight between the infrared remote controller and the target device.

New technology such as radio frequency (RF) allows remote controllers to function when they are not physically proximate to a target device. These have been incorporated in remote controllers. Presently, it is possible to have remote controllers that work from many miles away from the target device. In such cases, it is necessary to provide feedback via the remote controller rather than by the target device. However, it is not always necessary to have a remote controller that provides feedback in the case when the user is within a viewing proximity of the target device. In such cases, the user can receive feedback from the target device itself. This is beneficial since valuable resources such as screen/button acreage is saved. Thus, it is desirable to have a remote controller that provides automatic feedback only when a user cannot receive feedback from the target device.

SUMMARY OF THE INVENTION

Accordingly, the present invention is a method and apparatus for an adaptive remote controller. The remote controller comprises a user control input, a detector, and a user interface. The user control input is configured to receive user input and issue at least one control signal to a target device. The detector is configured to detect if the remote controller is within a target device feedback range of the target device. If the remote controller is out of the target device feedback range, the user interface provides feedback that the control signal was successfully sent to and executed by the target device.

BRIEF DESCRIPTION OF THE DRAWINGS

The present invention is illustrated by way of example, and not limitation, in the figures of the accompanying drawings in which.

DETAILED DESCRIPTION

A method and an apparatus for an adaptive remote controller are disclosed. Reference will now be made in detail to the embodiments of the invention, examples of which are illustrated in the accompanying drawings. While the invention will be described in conjunction with numerous embodiments, it will be understood that they are not intended to limit the invention to these embodiments. On the contrary, the invention is intended to cover alternatives, modifications and equivalents, which may be included within the spirit and scope of the invention as defined by the claims.

Figure 1:
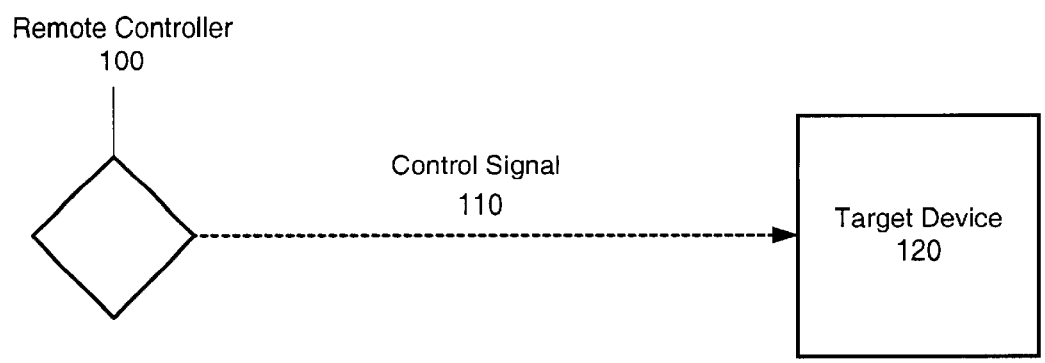
FIG. 1 illustrates a block diagram of an adaptive remote controller signaling a target device.

FIG. 1 illustrates an embodiment of an adaptive remote controller 100 signaling a target device 120. Generally, a remote controller 100 sends at least one control signal 110 to a target device 120 so that the target device 120 performs a function. FIG. 1 shows the remote controller 100 sending a control signal 110 to one target device 120. However the remote controller 100 may be configured to send control signals 110 to any number of target devices 120.

Figure 2:
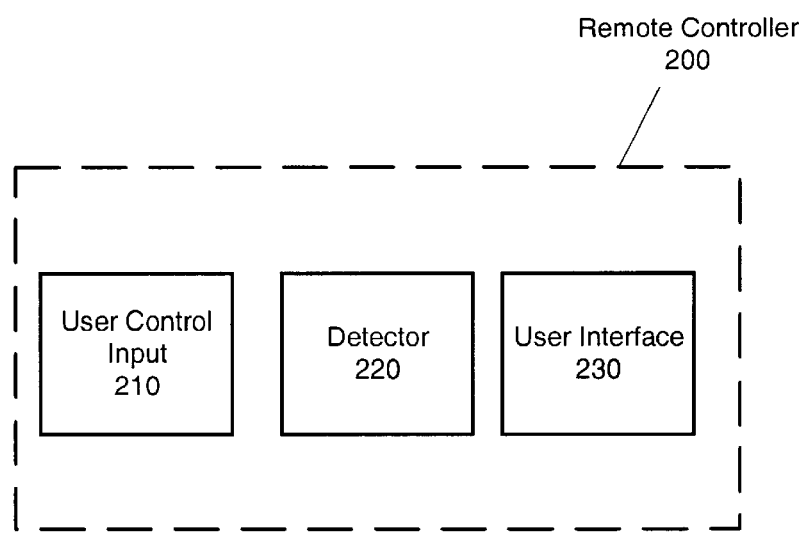
FIG. 2 illustrates an embodiment of a remote controller.

FIG. 2 illustrates an embodiment of a remote controller 200. The remote controller 200 comprises a user control input 210, a detector 220, and a user interface 230. The user control input 210 is configured to receive user input and issue at least one control signal to a target device. The detector 220 is configured to detect if the apparatus is within a target device feedback range. The user interface 230 provides feedback as to whether the control signal was successfully sent to and executed by the target device. As will be described below, the user interface 230 provides feedback only if the remote controller is out of the target device feedback range.

Figure 3:
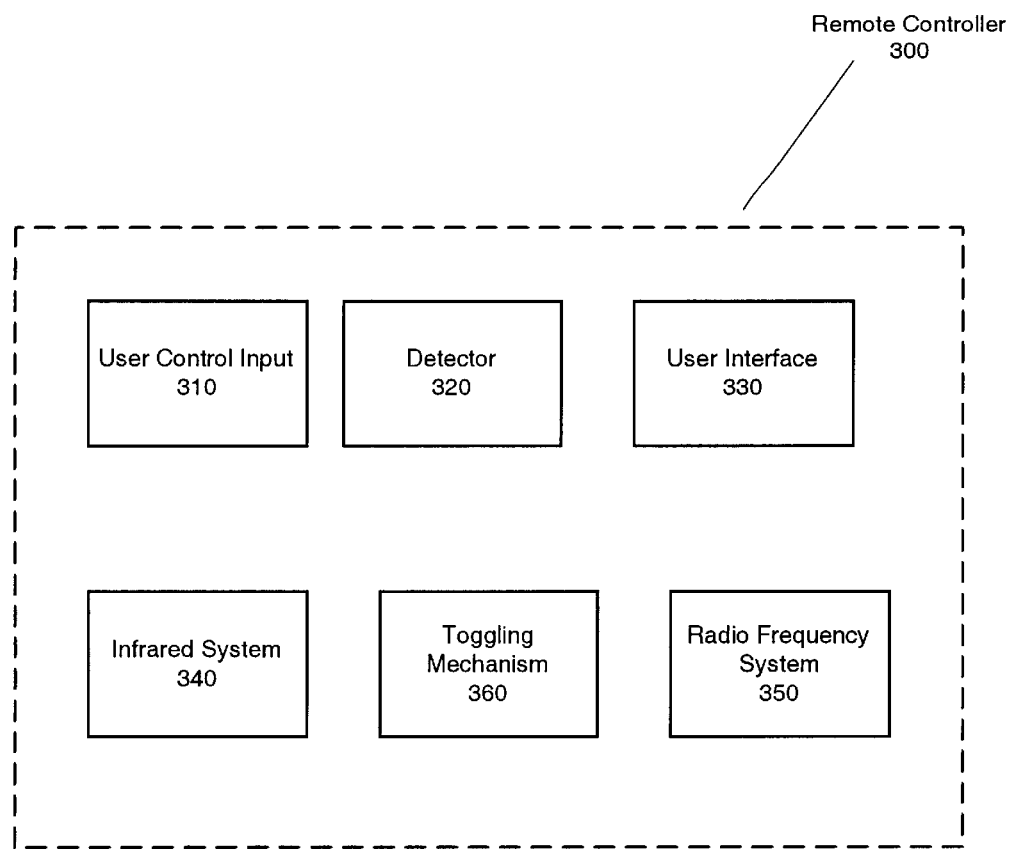
FIG. 3 illustrates an alternative embodiment of a remote controller.

FIG. 3 illustrates an alternative embodiment of a remote controller 300. The remote controller 300 comprises a user control input 310, a detector 320, and a user interface 330. The user control input 310 comprises an infrared system 340. Generally, an infrared system sends a signal via a laser from one device to another device. For an infrared system to be functional there must be an unobstructed line of sight between the devices. Thus, an infrared system is limited in range. The user control input 310 of the remote controller 300 may use the infrared system 340 to send at least one signal to the target device when the remote controller is within the target device feedback range.

The user control input 310 also includes a radio frequency system 350. The radio frequency system uses radio waves to send signals between devices. Thus, a device using a radio frequency system may send signals at a far greater distance than signals sent by an infrared system and is not limited to line of sight. The user control input 310 uses the radio frequency system 350 to send at least one signal to the target device when the remote controller 300 is not within the target device feedback range. A toggling mechanism 360 located on the remote controller 300 switches between the infrared system 340 and the radio frequency system 350. The toggling mechanism 360 that is used to switch from the infrared system 340 to the radio frequency system 350 and vice versa is controlled by the detector 320. The detector 320 determines whether the remote controller 310 is within the target device feedback range and activates the toggling mechanism 360 as necessary. In alternative embodiments, the user control input may only comprise an infrared system or may only comprise a radio frequency system.

An example of an application of the embodiment shown in FIG. 3 is a user attempting to turn on a television set. The remote controller may send a signal to the television set via the infrared system when the user is holding the remote control in the same room as the television set. This is possible because there is an unobstructed line of sight between the remote controller and the television set. In addition, feedback as to the successful execution of a function in response to the transmitted signal is provided in the television set. However, when the user is in a different room and attempts to send a signal from that room to a different room where the television set is located, the remote controller uses a radio frequency system to send the signal and feedback relevant to the execution of a particular function corresponding to the signal sent is received via radio frequency communication and provided to the user on the remote controller.

In an alternative embodiment, the detector may use a set of tags to detect the actual distance between the remote controller and the target device. A first tag is on the remote controller, and a second tag is on the target device. The detector may be configured to sense the tags and determine the distance between the first and second tags. From this information, the detector is able to determine if the remote controller is within the target device feedback range.

In one embodiment, the target device feedback range is an unobstructed line of sight between the remote controller and the target device. In an alternative embodiment, the target device feedback range may be an audible hearing distance between the remote controller and the target device. In other alternative embodiments, the target device feedback range may be something else, such as a definite distance of ten meters.

In one embodiment, the user control input includes a group of buttons on the remote controller and a control display. The user may depress a plurality of buttons to cause the remote controller to send control signals to the target device. The control display may then display feedback that the target device received and executed the control signals if the remote controller is not within the target device feedback range. In an alternative embodiment, the user may speak audible requests to the user control input in order to send the control signals to the target device. In the latter embodiment, the remote controller may or may not have a control display. In another alternative embodiment, there may be a mechanism such as a feedback button on the remote controller that would allow the user to automatically request feedback after sending the control signals regardless of the range of the remote controller to the target device.

In another alternative embodiment, the user control input includes a group of dynamic buttons forming a specific remote control on the display of a personal digital assistant (PDA). The user may depress a plurality of buttons to cause the PDA to send control signals to the target device. The PDA display may then display feedback that the target device received and executed the control signals if the PDA is not within the target device feedback range.

In one embodiment, the detector device uses a bluetooth™ communications standard to detect the range between the target device and the remote controller. Bluetooth™ is the protocol for a short-range (ten meter), frequency-hopping radio length between devices. A device following the Bluetooth™ standard eliminates the need for wires and cables while allowing for data and voice communication interaction between that device and another device using the Bluetooth™ standard. Other wireless communication protocols may also be used.

In one embodiment, the feedback from the user interface is a sound. In alternative embodiments, the feedback from the user may be, but is not limited to, a visual image, illuminating buttons, or a displayed message.

Figure 4:
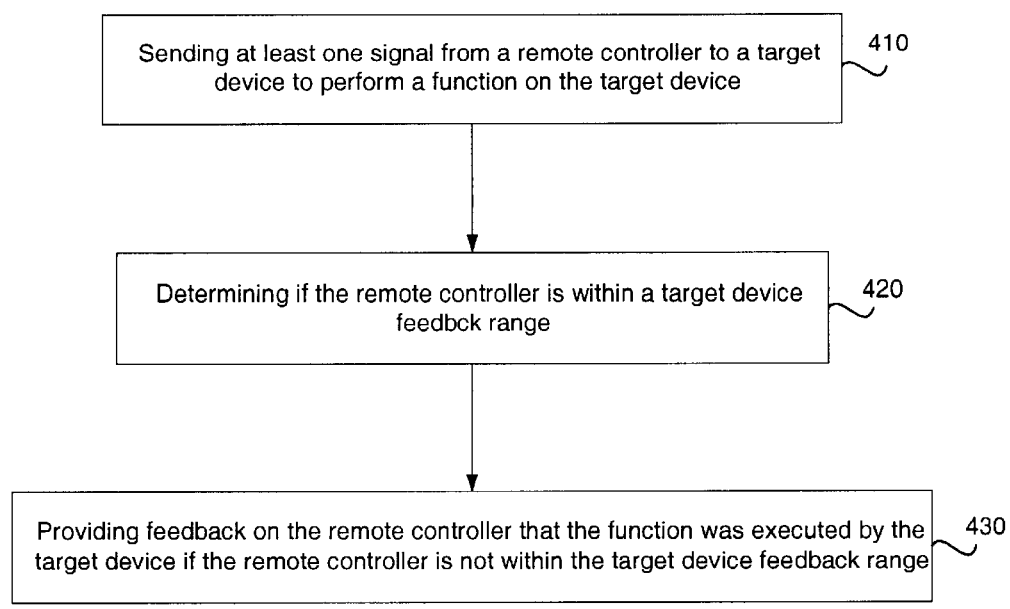
FIG. 4 illustrates a flow diagram for one embodiment of a process of sending a signal from a remote controller to a target device.

FIG. 4 illustrates a flow diagram of one embodiment for a process of sending a signal from a remote controller to a target device. At processing block 410, at least one signal is sent from a remote controller to a target device to perform a function on the target device. At processing block 420 it is determined whether the remote controller is within a target device feedback range. At processing block 430, the remote controller provides feedback as to whether the function was executed by the target device if the remote controller is not within the target device feedback range.

Figure 5:
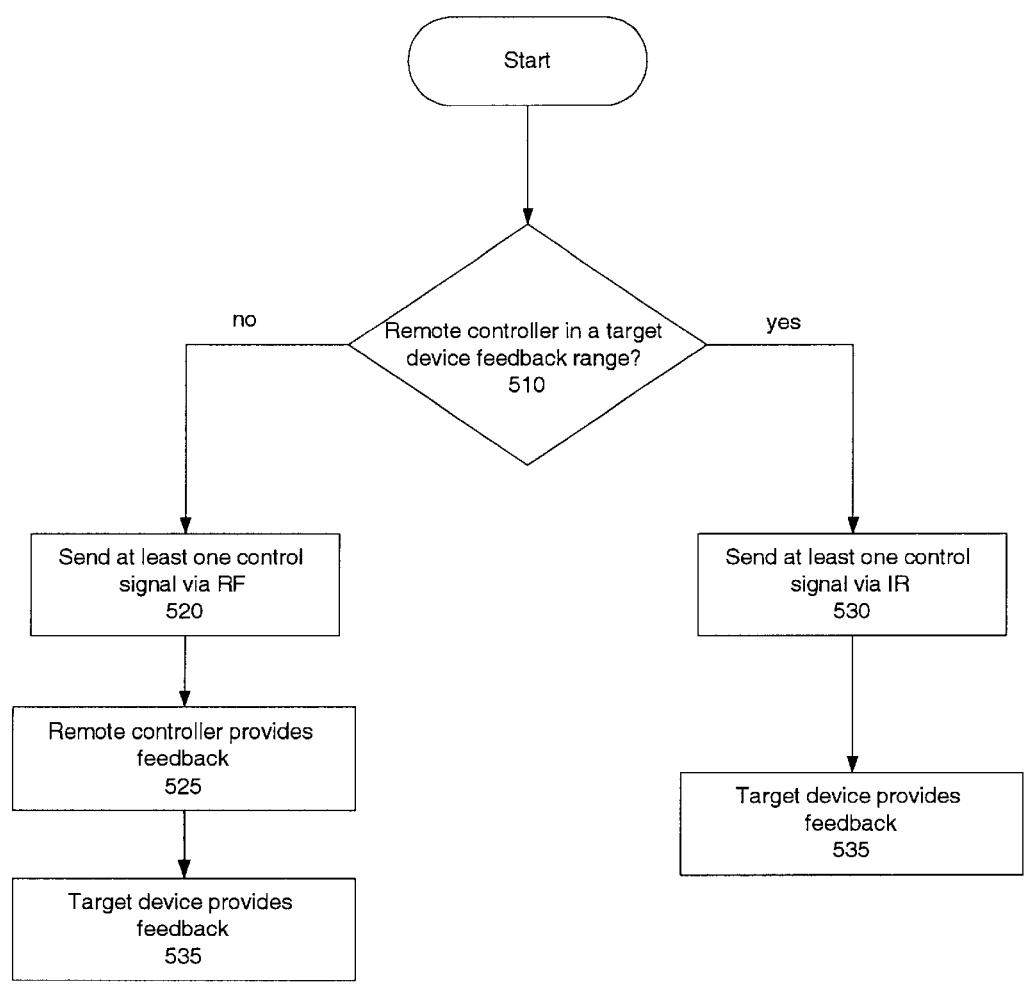
FIG. 5 illustrates a flow diagram for an alternative embodiment of a process of sending a signal from a remote controller to a target device.

FIG. 5 illustrates a flow diagram of an alternative process of sending a signal from a remote controller to a target device. At processing block 510 the process starts with a detector in the remote controller determining whether the remote controller is within a target device feedback range. If it is determined that the remote controller is not within the target device feedback range, the process moves to step 520. At processing block 520, at least one signal from the remote controller is sent to the target device using radio frequency (RF). At processing block 525, the remote controller provides feedback as to whether the control signal was received by the target device and the function was executed by the target device. At processing block 535, the target device also provides feedback. If it is determined at processing block 510 that the remote controller is within the target device feedback range, the process moves to step 530. At processing block 530, at least one control signal from the remote controller is sent to the target device using infrared (IR). At processing block 535, the target device provides feedback.

It is contemplated that switching between different systems, e.g., IR and RF may be performed at any time. In one embodiment, this may be manually performed by the user. In an alternative embodiment, this is automatically performed. Furthermore, a switch may be performed after transmission of a signal to a target device and the target device's response to the signal. Thus, for example, if a user is walking around, a signal may be sent using IR to turn down the volume on the television set (target device) and feedback that the volume was turned down is sent using RF and provided to the user on the remote controller.

A method and apparatus for an adaptive remote controller has been described. Although the present invention has been described with reference to specific embodiments, the specification and drawings are to be regarded as illustrative rather than restrictive.

What is claimed is:

1. An apparatus comprising:
   a user control input configured to receive user input and issue at least one control signal to a target device;
   a detector configured to detect if the apparatus is within a target device feedback range; and
   a user interface to provide feedback that the control signal was successfully sent to and executed by the target device, the user interface active if the apparatus is out of the target device feedback range and inactive if the apparatus is within the target device feedback range.

2. The apparatus as set forth in claim 1 wherein the user control input comprises an infrared system to send at least one signal to the target device.

3. The apparatus as set forth in claim 1 wherein the user control input comprises an infrared system to send at least one signal to the target device when the input controller is within the target device feedback range.

4. The apparatus as set forth in claim 1 wherein the user control input comprises a radio frequency (RE) system to send at least one signal to the target device.

5. The apparatus as set forth in claim 3 wherein the user control input comprises a radio frequency system (RF) to send at least one signal to the target device when the user control input is not within the target device feedback range.

6. The apparatus as set forth in claim 5 wherein the target device feedback range is an unobstructed line of sight between the apparatus and the target device.

7. The apparatus as set forth in claim 5 further comprising a toggling mechanism to switch between the infrared system and the radio frequency system.

8. The apparatus as set forth in claim 1 wherein the target device feedback range is an audible hearing distance between the apparatus and the target device.

9. The apparatus as set forth in claim 1 wherein the user control input is selected from the group consisting of user buttons and a control display.

10. The apparatus as set forth in claim 1 wherein the user speaks audible requests to the user control input.

11. The apparatus as set forth in claim 1 wherein the feedback is selected from the group consisting of a sound, a visual image, illuminating buttons, and a message.

12. An apparatus comprising:
a remote controller that transmits at least one control signal to a target device based on user input, the remote controller having a detector configured to detect if the target device is within a target device feedback range of the remote controller; and
a user interface on the remote controller to provide feedback as to whether the control signal was sent to and executed by the target device, the user interface active if the target device is not within the target device feedback range of the remote controller and inactive if the target device is within the target device feedback range of the remote controller.

13. A method comprising:
sending at least one signal from a remote controller to a target device to perform a function on the target device;
determining if the remote controller is within a target device feedback range; and
providing feedback through a user interface of the remote controller as to whether the function was executed by the target device if the remote controller is not within the target device feedback range, the user interface inactive if the remote controller is within the target device feedback range.

14. The method as set forth in claim 13 further comprising the step of sending at least one signal from the remote controller to the target device using an infrared system.

15. The method as set forth in claim 13 further comprising the step of sending at least one signal from the remote controller to the target device using an infrared system when the remote controller is within the target device feedback range.

16. The method as set forth in claim 13 further comprising the step of sending at least one signal from the remote controller to the target device using a radio frequency (RF) system.

17. The method as set forth in claim 15 further comprising the step of sending at least one signal from the remote controller to the target device using a radio frequency (RF) system when the remote controller is not within the target device feedback.

18. The method as set forth in claim 17 wherein the target device feedback range is an unobstructed line of sight between the apparatus and the target device.

19. The method as set forth in claim 18 further comprising the step of switching between the infrared system and the radio frequency system.

20. The method as set forth in claim 13 wherein the target device feedback range is an audible hearing distance between the apparatus and the target device.

21. The method as set forth in claim 13 wherein the user control input is selected from the group consisting of user buttons and a control display.

22. The method as set forth in claim 13 wherein the user speaks audible requests to the user control input.

23. The method of claim 13 wherein the feedback is selected from the group consisting of a sound, a visual image, illuminating buttons, and a message.

24. An apparatus comprising:
means for receiving user input and issuing at least one control signal to a target device;
means for detecting if the apparatus is within a target device feedback range; and
means for providing feedback that the control signal was successfully sent to and executed by the target device, the means for providing feedback active if the apparatus is out of the target device feedback range and inactive if the apparatus is within the target device feedback range.

25. The apparatus as set forth in claim 24, wherein the means for receiving user input comprises a radio frequency (RF) system to send at least one signal to the target device, and wherein the target device feedback range is an unobstructed line of sight between the apparatus and the target device.

26. The apparatus as set forth in claim 24 wherein the target device feedback range is an audible hearing distance between the apparatus and the target device.

27. The apparatus as set forth in claim 24 wherein the means for providing feedback is selected from the group consisting of a sound, a visual image, illuminating buttons, and a message.

28. A machine-readable medium having executable instructions to a cause a device to perform a method comprising:
sending at least one signal from a remote controller to a target device to perform a function on the target device;
determining if the remote controller is within a target device feedback range; and
providing feedback through a user interface of the remote controller as to whether the function was executed by the target device if the remote controller is not within the target device feedback range, the user interface inactive if the remote controller is within the target device feedback range.

29. The machine-readable medium of claim 28, wherein the method further comprises:
sending at least one signal from the remote controller to the target device using a radio frequency (RF) system, wherein the target device feedback range is an unobstructed line of sight between the apparatus and the target device.

30. The machine-readable medium of claim 28, wherein the target device feedback range is an audible hearing distance between the apparatus and the target device.

31. The machine-readable medium of claim 28, wherein the feedback is selected from the group consisting of a sound, a visual image, illuminating buttons, and a message.

* * * * *